3 Sheets—Sheet 1.

E. BALL.

Mowing Machine.

No. 1,013.

Reissued July 17, 1860.

WITNESSES

John P. Adams

A. Mudlesmile

INVENTOR

Ephraim Ball

By his Attorney

Thomas Dodge

N. PETERS. Photo-Lithographer. Washington, D. C.

E. BALL.
Mowing Machine.
No. 1,013. Reissued July 17, 1860.
Fig. 5
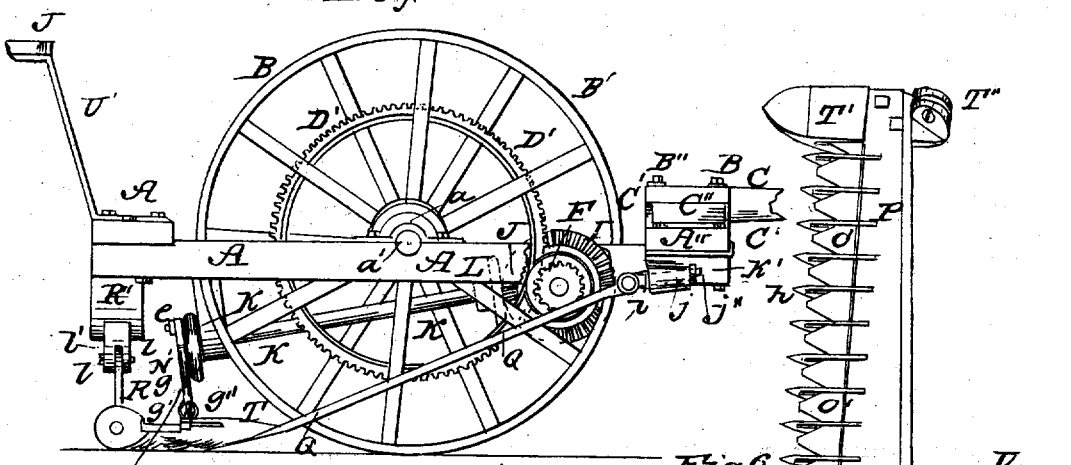
Fig. 6
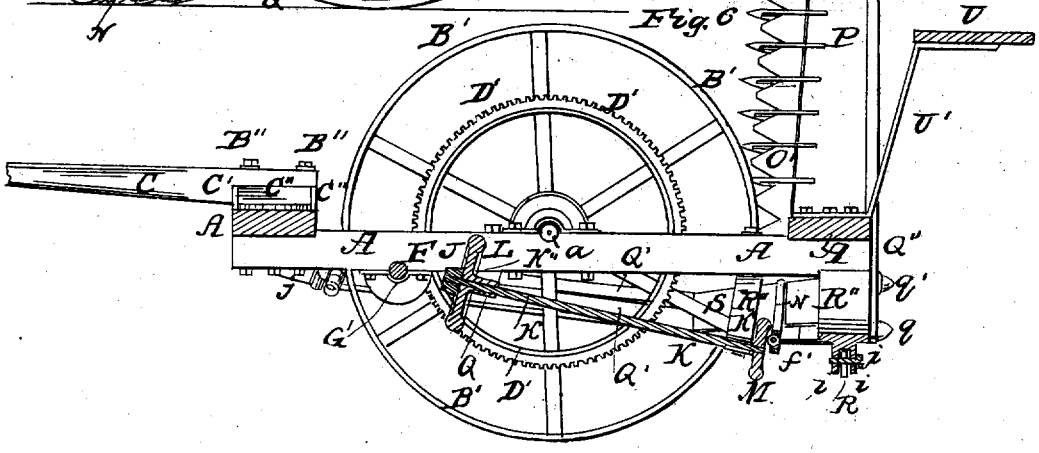
Fig. 7
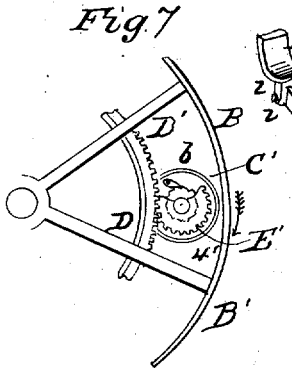
Fig. 8
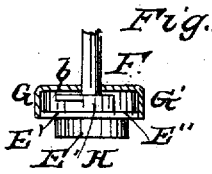
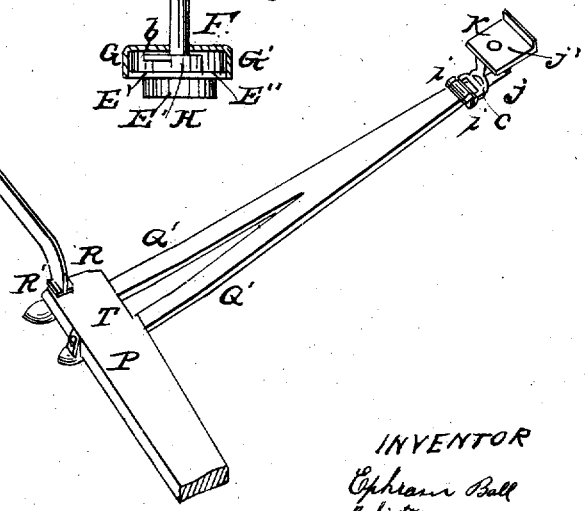
WITNESSES
John L. Adams
A. Williamson
INVENTOR
Ephraim Ball
By his attorney
Hamet H. Dodge
N. PETERS, Photo-Lithographer, Washington, D. C.

3 Sheets—Sheet 3.

E. BALL.

Mowing Machine.

No. 1,013.

Reissued July 17, 1860.

Witnesses
John L. Adams
M. Niddiamly

Inventor
Ephraim Ball
by his Attorney
Thomas X. Boggs

N. PETERS. Photo-Lithographer, Washington, D. C.

UNITED STATES PATENT OFFICE.

EPHRAIM BALL, OF CANTON, OHIO.

IMPROVEMENT IN MOWING-MACHINES.

Specification forming part of Letters Patent No. 18,788, dated December 1, 1857; Reissue No. 832, dated September 27, 1859; Reissue No. 1,013, dated July 17, 1860.

DIVISION No. 4.

*To all whom it may concern:*

Be it known that I, EPHRAIM BALL, of Canton, in the county of Stark, in the State of Ohio, have invented certain new and useful Improvements in Mowing-Machines, of which the following is a full, clear, and exact description, reference being had to the accompanying drawings, which make a part of this specification, and in which—

Figure 1:
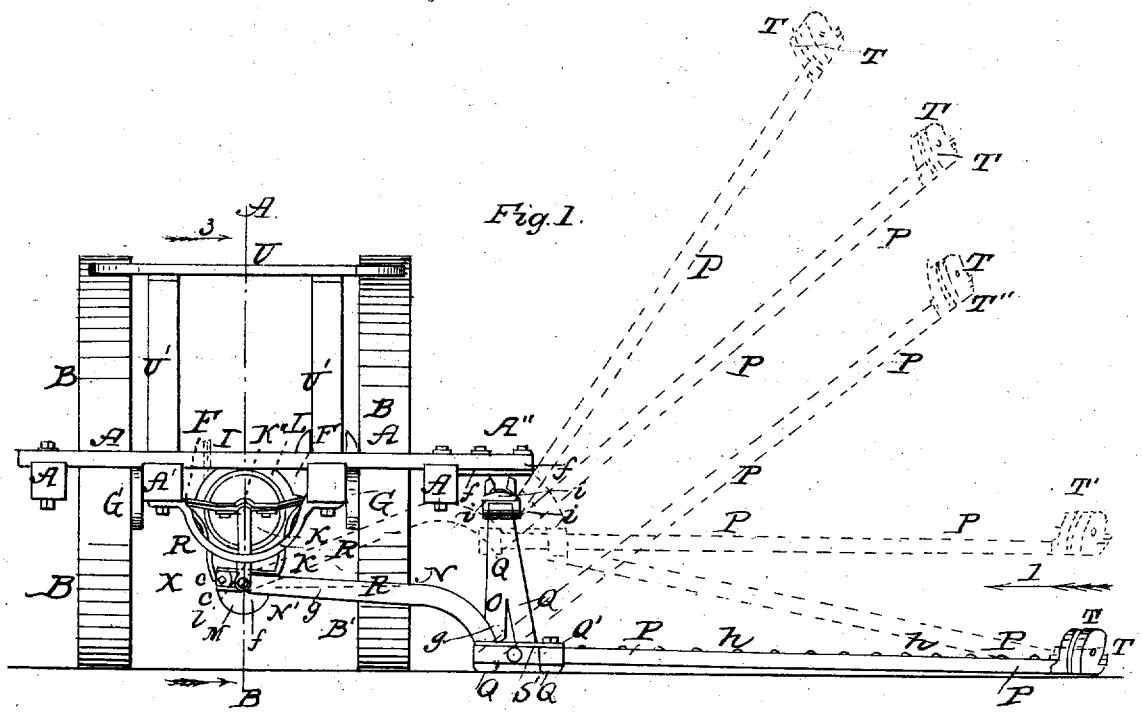
Figure 2:
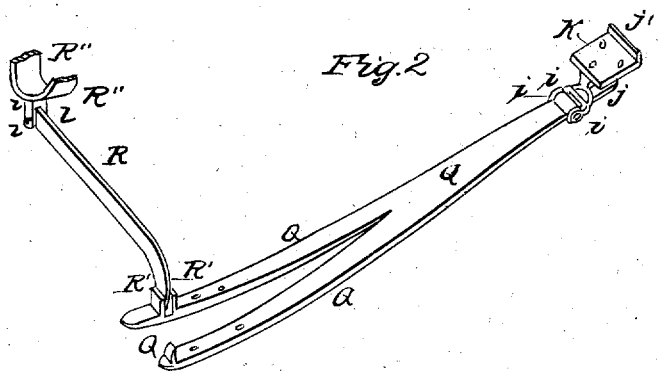
Figure 3:
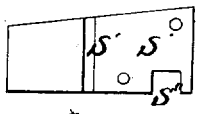
Figure 4:
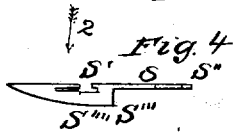
Figure 10:
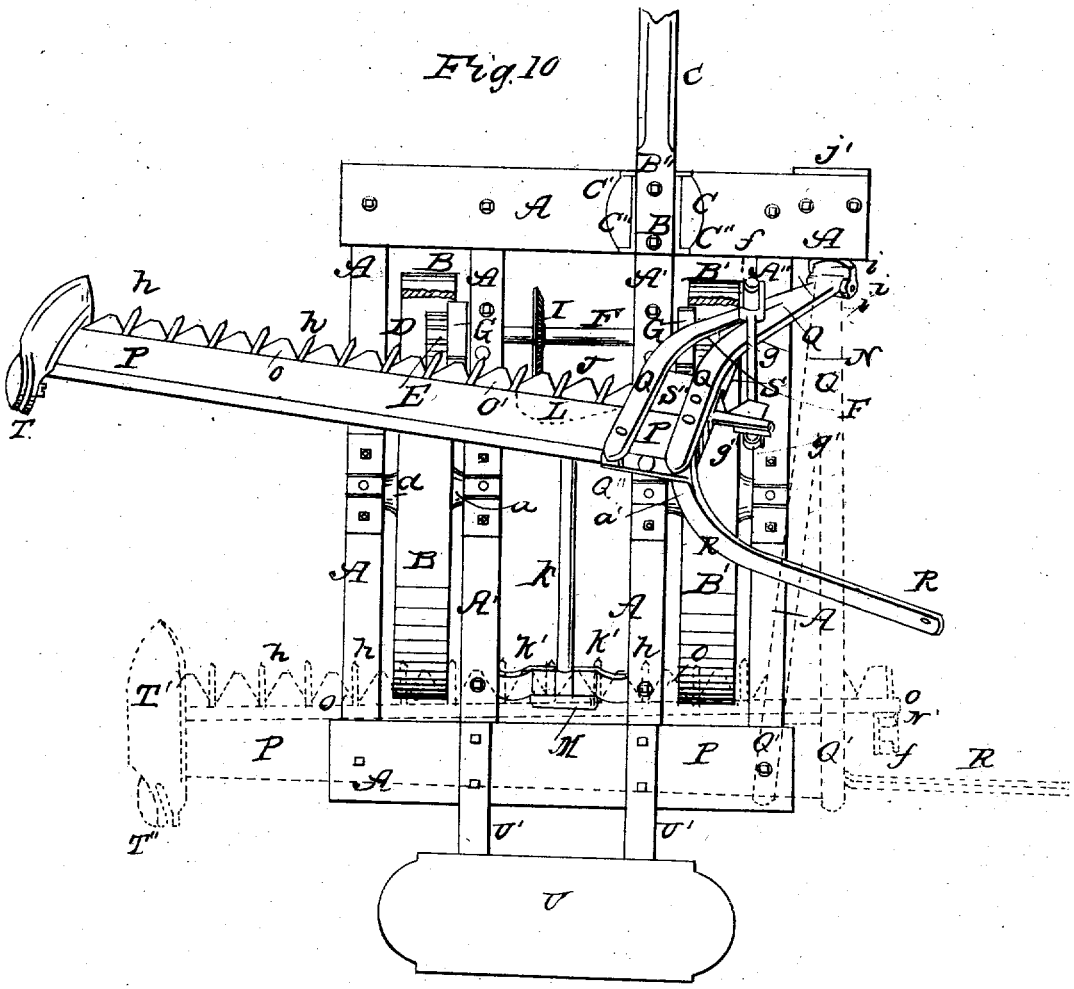

Figure 1 represents a rear view of the machine, the black lines showing the finger-beam resting upon the ground in the position it will occupy when the machine is mowing upon a level surface, the blue lines showing one position of the finger-bar when mowing on an uneven surface, with the left end raised to conform thereto, the red lines showing the position of the finger-beam when mowing upon an uneven surface, which raises the entire finger-beam, the dotted black lines showing the position of the finger-beam raised up at its right or outer end toward the machine to pass over an obstacle, and the dotted red lines showing the finger-beam in two different positions raised off of the ground and turned up toward the machine to pass over obstacles or through gates. Fig. 2 represents a view in perspective of the yielding brace-bar or shoe part, to which the finger-beam is attached, together with the yielding coupling-arm and certain other parts connected therewith, the same being shown detached. Fig. 3 represents a top or plan view of the metallic part S, through which the heel of the cutter-bar and inner cutter works. Fig. 4 is a side view of the same, looking in the direction of arrow 2, Fig. 3. Fig. 5 represents a side view of the machine, looking in the direction of arrow 1, Fig. 1, when the machine is mowing on level ground, a part of the main frame being represented as broken away to show the position of the gearing. Fig. 6 represents a section on line A B, Fig. 1, looking in the direction of arrow 3, the finger-beam being shown in the highest position represented in red dotted lines, Fig. 1. Fig. 7 represents a detached view of a portion of one of the main wheels and a portion of its gearing, a part of the pinion which gears into one of the main gear-wheels being represented as broken away, together with its shield, to show one of the ratchet-wheels with its pawl, spring, and case, and by which motion is communicated from the main wheel to the main gear-shaft. Fig. 8 represents a detached plan or top view of one of the pinions on the main gear-shaft, together with its ratchet-wheel and pawl, the top of the case which covers the ratchet-wheel being represented as broken away to show the relative position of the parts. Fig. 9 represents a detached view, in perspective, of the yielding brace-bar or shoe part and coupling-arm, similar to Fig. 2, with the addition of a portion of the finger-beam, showing the mode in which the heel of the finger-beam is supported by its yielding brace-bar or shoe part. Fig. 10 represents a top or plan view of the machine (a part of the peripheries of the wheels B B being broken away, together with a portion of the part marked S, to show the position of the pinion-wheels E E′,) with the finger-beam and cutter folded over upon the frame in a compact manner. The black lines show the finger-beam supported or folded above the main frame in front of the axes of the main supporting-wheels to facilitate the removal of the machine from field to field, and the red lines show the position of the finger-beam when folded back over the rear of the main frame.

When it may be expedient to use one or more of the several parts or branches of my improvements separate from the rest, such part or parts may be used in connection with proper frames and gearing, although different from those herein described, which are proportioned and arranged with reference to the use of the whole of the parts together; and it is obvious that several parts of my improvements are applicable to several other mowing-machines in use.

One mode of applying each of my improvements to practical use being shown in this machine, it is unnecessary to specify the manner of applying the parts respectively to other mowing-machines, since the ordinary skill of the constructer will be sufficient for that purpose.

Mowing-machines as heretofore constructed have not possessed the advantages due to a hinged folding finger-beam—*i. e.*, a finger-beam so hinged to the main frame as to rest on the ground and freely conform to the irregularities thereof independently of the up and down motions of the main frame when mowing, while at the same time possessing the capability of being raised bodily and turned or folded over or on top of the main frame to facilitate the removal of the machine from field to field or from place to place.

To secure the above advantages in a mowing-machine is the object of that branch of my improvements which is the subject of this patent, and which consists, first, in so hinging the shoe to which the heel of the finger-beam is attached and by which it is drawn over the ground as that the finger-beam will not only be free to rise and fall at either end or at both ends independently of the main frame, but will also be capable of being raised and folded or turned so as to occupy a position on top or above the main frame without disconnecting the hinge by which it is drawn, as will be hereinafter described.

It also consists in so arranging the draft-hinge as respects the main frame as that the weight of the finger-beam, when folded or turned over on top of the main frame, can be made to rest on the main frame in front of the axes of the main supporting-wheels to prevent the machine from canting back, and also in such a position as to prevent the machine from having a tendency to turn over laterally when carrying the finger-beam in a folded position.

It also consists in attaching the finger-beam to a shoe or yielding brace-bar of such length as that the finger-beam can be folded either over or under the rear of the main frame, when desirable, without detaching the draft-hinge.

It also consists in combining certain elements or features in the construction of the metallic device which supports the heel of the finger-beam and guides the heel cutter-bar. The elements which I have thus combined are the following: first, a curved metallic surface to run upon the ground like a shoe or runner; second, a recess in which the heel of the finger-beam can be placed so as to be supported in front and in rear, and also be protected from injury by the metallic surface of the device which runs on the ground; third, a suitable vertical groove or recess for the heel of the cutter-bar to vibrate in, and also a horizontal one for the inner cutter to work in; fourth, a forward upward extension, whereby the device can be connected to the main frame by a yielding connection in advance of the heel of the finger-beam; fifth, two ears or lugs on the side which runs next to the main frame, for the convenient and secure hinging of the end of the coupling-arm next the standing grass.

It also consists in the combination and arrangement of certain elements in the construction of the metallic shoe which supports the outer end of the finger-beam, tracker, and guides the outer end of the cutter-bar and cutter. The elements which I have thus combined are as follows: first, a curved metallic surface to run upon the ground like a shoe or runner; second, a recess in which the outer end of the finger-beam can be securely fastened, so as to be well supported both in front and rear; third, a suitable recess or groove in which the cutter-bar and outer cutter can have free play, while at the same time they are kept in line with the openings in the guards; fourth, two lugs in rear, with a narrow slit or opening between them, and so arranged as that the tracker, which is to be hinged between said lugs, will be supported on each side, while it be held in a position at an angle of about thirty degrees to a line at right angles to the line of motion of the machine, whereby the cut grass is thrown inward, so as to leave a clear space for the machine on the next round.

As my machine is fully described in other patents granted to me of even date herewith, I do not deem a detailed description here necessary.

The inner end or heel of the finger-beam P is rigidly secured to the lower double runner or forked ends, Q′ Q′, of a strong metallic draft-shoe or yielding brace-bar Q, the forward end of which extends upward and forward, and is hinged between lugs *i i* of a wrist or swivel, *i′*, which is free to turn on an axis parallel to the line of motion of the machine in a piece, *j*, hinged to piece *j′* by a screw or pivot, *k*, the piece *j* being bolted firmly to the under side of the inner projecting part, A″, of the main frame, while the wrist or swivel-piece *i′* is held in place by nut *k′*.

A coupling-arm, R, is hinged at its right end between the lugs R′ R′, which project up from the left side or fork of the shoe or yielding brace-bar Q and at the heel of the finger-beam P, while its left end is hinged on a line with the longitudinal center of the crank-shaft K, between lugs *l l*, projecting down from a hanger, R″, which is firmly bolted to the rear under sides of the pieces A′ A′ of the main frame.

While the machine is in operation the finger-beam P, which supports the cutters, can freely rise and fall bodily, or either end can freely rise and fall independently of the other end and of the main frame, since the hinged connection of the yielding brace-bar or shoe Q with the wrist *i′* allows of a free up-and-down movement of the entire finger-beam, and as the wrist or swivel-piece *i′* is free to turn in the piece *j*, the yielding brace-bar or hinged draft-shoe Q and finger-beam P have also a free rolling or lateral motion at right angles, or nearly so, to the line of motion of the machine, while the coupling-arm, which is hinged to the shoe or yielding brace-bar to which the heel of the finger-beam is attached, serves to steady the finger-beam laterally and to prevent it from being wrenched out of place, as respects the main frame, by the resistance of the grass or of obstacles in its path.

In mowing-machines it is often desirable to fold up or turn over the finger-beam upon the main frame to facilitate the removal of the machine from place to place or from one field to another. By my invention this is easily done, and that, too, without disturbing or disconnecting the draft-hinge by which the finger-beam and cutters are drawn over the ground. In Fig. 10 of the accompanying drawings the finger-beam P and cutters are shown in black lines in the position they occupy when folded or turned over the top of the main frame preparatory to moving the machine from one field to another. When in this position the weight of the finger-beam, cutter, and shoe, taken together, is borne about equally by the wheels B B′, thereby rendering the machine very evenly balanced when the finger-beam is folded or turned over the top of the main frame. The position, too, of the finger-beam is such that the weight thereof rests on the main frame in front of the axis of the main supporting-wheels, and thus all tendency of the machine to tip back, even in ascending hills, is obviated.

To fold up the finger-beam the left ends of the coupling-arm and pitman are disconnected, (which is easily done by unscrewing nut *e* and bolt *l′*,) when the finger-beam, by reason of its hinged and swiveled draft-connection, already described, can be raised, turned, and folded over the frame, as shown in the drawings, the swivel or wrist *i′* supporting or holding the finger-beam in its elevated or folded position, while the yielding brace-bar or shoe Q rests or leans against the side of the main frame.

In packing the machine in cars or for storage the finger-beam may be folded back over the rear of the main frame, as shown in red lines, Fig. 10.

I will now point out the difference between my invention for folding the finger-beam and that for which a reissued patent was granted to Cyrenus Wheeler, Jr., on the 3d of January, 1860, on a patent granted the 5th of December, 1854.

Wheeler, in his reissued patent, (Division F,) says that "for the purpose of transportation or for passing through gates or narrow lanes it is desirable that the cutter-bar, which projects beyond the main frame of the machine, should be susceptible of being folded up to and supported by the main frame." He also states that such a result is effected in his machine as follows: "Disconnect the lever I from the piece H by removing its fastening and lift the cord or chain *p* from its pulley *g*. The piece H is then free to swing back of the frame. The cutter-bar can then be swung or folded against the side piece, C, and be fastened there." In my machine, instead of the finger-beam occupying a place at the side or rear of the frame, as in Wheeler's case, it can be raised up and folded over the top of the frame "and be fastened there" with as much, if not actually more, celerity than Wheeler's can "be fastened" at the side or rear of his frame. In Wheeler's proposed arrangement the finger-beam and cutters would be liable to strike against stumps or stone heaps if the machine should happen to pass by or over them, whereas in my machine the finger-beam and cutters are raised up above the main frame, whereby all the danger in this respect is avoided. Again, if the machine is to be left standing in the field, the cutters can be raised up and folded over the frame in rear of the main wheels, so as to have them out of the way of the feet of cattle should they happen to be running about the inclosure. In my machine, as the finger-beam is free to rise and fall bodily or at either end independently of the other end and of the main frame, I have devised a new metallic device for supporting the heel of the finger-beam and the parts connected therewith, so that the right end of the coupling-arm, heel of the finger-beam, heel of cutter-bar, and inner cutter shall always maintain their proper relative position, however much the heel of the finger-beam may be thrown about by undulating ground.

The bottom or runner part of this device is represented by letters Q Q′ Q′. From the rear of the latter rise up the parts Q″ and R′ R′. S represents another part of the device, and is shown detached in Figs. 3 and 4, for the purpose of a more full representation. Part S is in this instance made up of three pieces—viz., part S′″′, which rests on the runners Q′ Q′, the part which projects over the heel of the finger-beam and forward of the rear of the inner cutter, and the part corresponding in thickness to it, which fits over the front of the inner cutter. Said parts are then securely riveted together, so as to present the appearance shown in Figs. 3 and 4, (the upper part of the piece which rests on the runners Q′ Q′ being recessed out for the cutter-bar,) after which the part S is securely and permanently riveted to the runners Q′ Q′, so as to occupy the relative position as shown in Figs. 6 and 10 of the drawings. It will thus be seen that the finger-beam has a firm and rigid support in front against the part S′″—one on the bottom against the runners Q′ Q′ and one in rear against the part Q″—while the ears or lugs R′ R′ afford rigid and firm supports for the pivot of the right hinge of the coupling-arm, and the groove S′ a suitable guide or space for the free play of the heel of the cutter-bar and inner cutter.

As the various parts of this device are made of metal, and are as securely and permanently fastened together as if soldered or brazed to each other, they are rendered for all practical purposes as good as if made in one piece; and I do not wish to be understood as claiming making said device from several pieces, since it might be made in one piece; and it is evident that the form and proportion of the parts may be somewhat changed and yet retain the essential features of my invention—viz., a front, bottom, and rear support for the heel of the finger-beam, together with a suitable groove for the cutter-bar and inner cutter and ears for hinging the coupling-arm, all in one rigid metallic device. Bolts are passed through the heel of the finger-beam and through the runner part of the device above described.

T′ is the metallic shoe, cast in one piece, for supporting the outer end of the finger-beam, guiding the cutter-bar and outer cutter, and sustaining the tracker in slit T″, as will be understood from the drawings by those skilled in the art.

What I claim under this patent as my invention is—

1. The combination of a hinged folding finger-beam with the main frame, whereby the finger-beam can be raised, turned, or folded up on or over the main frame without detaching the draft-hinge, to facilitate the removal of the machine from place to place or from field to field, substantially as set forth.

2. So hinging the finger-beam to the main frame as that the weight of the finger-beam, when folded up thereon, shall rest on or be borne by the main frame in front of the axes of the main supporting wheel or wheels, substantially as set forth.

3. The combination of the finger-beam with the main frame and mechanism so constructed and combined therewith as that the finger-beam can be raised bodily and then turned and held up to render the removal of the machine from place to place more convenient, expeditious, and safe, substantially as set forth.

4. The combination of the finger-beam with the main frame, whereby the finger-beam can be raised, turned, or folded over on or above the main frame, so that its weight shall be borne by the main frame in rear of the axes of the supporting-wheels, substantially as herein described.

5. The combination of the finger-beam with the main frame, whereby the finger-beam can be raised and turned over above the main frame, with its weight resting either in front or in rear of the axes of the main supporting-wheels, substantially as and for the purposes herein set forth.

6. So hinging the finger-beam to the main frame as that the main frame shall be nearly balanced laterally when the finger-beam is folded up thereon, substantially as set forth.

7. So hinging the finger-beam to the main frame as that it can be folded under the main frame, substantially as and for the purposes set forth.

8. The combination of the finger-beam with the main frame so that the finger-beam can be either folded over or under the main frame, substantially as set forth.

9. The combination of the following elements in a shoe or metallic device for supporting the heel of the finger-beam, viz: a curved surface to run upon the ground like a runner, a recess or arrangement of parts whereby the heel of the finger-beam will have a rigid metallic support in front, on the bottom, and in rear, a suitable groove for the heel of the cutter-bar and inner cutter to play in, two metallic lugs on the side next to the main frame, between which to hinge a coupling-arm, all combined in one rigid and permanent shoe device.

10. The combination of the following elements in a metallic shoe for supporting the outer end of the finger-beam, viz: a curved surface to run upon the ground like a runner, a recess for the outer end of the finger-beam, whereby it can be bolted to the shoe so as to have a rigid support in front, on the bottom, and in the rear, a groove for the outer end of the cutter-bar and outer cutter to work through, and two lugs in the rear, said elements being combined and arranged in relation to each other substantially as shown and described.

In witness whereof I have hereunto signed my name.

EPHRAIM BALL.

Witnesses:

DANIEL GOTSHALL,

D. H. HARMER.